United States Patent [19]
Kates et al.

[11] Patent Number: 6,137,267
[45] Date of Patent: Oct. 24, 2000

[54] REVERSE CURRENT PROTECTION/CURRENT OVERSHOOT CONTROL FOR TWO QUADRANT BATTERY CHARGERS

[75] Inventors: Barry K. Kates, Austin; John Cummings, Round Rock, both of Tex.

[73] Assignee: Dell Computer Corporation, Round Rock, Tex.

[21] Appl. No.: 09/236,136

[22] Filed: Jan. 22, 1999

[51] Int. Cl.⁷ ............................................. H02J 7/00
[52] U.S. Cl. ........................................ 320/136; 320/135
[58] Field of Search ............................. 320/135, 136, 320/145, 141; 323/282, 287; 324/426

[56] References Cited

U.S. PATENT DOCUMENTS

| | | | |
|---|---|---|---|
| 5,552,695 | 9/1996 | Schwartz | 323/271 |
| 5,705,919 | 1/1998 | Wilcox | 323/282 |
| 5,723,970 | 3/1998 | Bell | 320/30 |
| 5,731,694 | 3/1998 | Wilcox et al. | 323/287 |
| 5,747,976 | 5/1998 | Wong et al. | 323/282 |
| 5,815,015 | 9/1998 | Nelson et al. | 327/141 |

*Primary Examiner*—Peter S. Wong
*Assistant Examiner*—Lawrence Luk
*Attorney, Agent, or Firm*—Skjerven, Morrill, MacPherson, LLP; Stephen A. Terrile; Mary Jo Bertani

[57] ABSTRACT

A limiting circuit for controlling overshoot in a charge current in a battery recharging system includes a current amplifier receiving input indicative of charge current in a rechargeable battery circuit and generating a current error signal, a voltage amplifier receiving input indicative of charge voltage in the rechargeable battery circuit and generating a voltage error signal, and a power amplifier receiving a first signal indicative of power in a switching voltage regulator and a second power signal indicative of power in the rechargeable battery circuit, and generating a power error signal. The limiting circuit compares the voltage error signal, the current error signal, and the power error signal to determine the error signal having the greatest value, and generates an input signal to a pulse width modulation comparator. The limiting circuit also includes an internal current source, a first transistor coupled to the current amplifier, a second transistor coupled to the voltage amplifier; and a third transistor coupled to the power amplifier. The first transistor, the second transistor, and the third transistor are coupled to the internal current source to determine the error signal having the greatest value. To prevent reverse current flow in the switching voltage regulator, a low current comparator receives a signal indicative of the current flowing in the switching voltage regulator, and generates an output signal. A transistor receives the output signal from the low current comparator, and generates a signal to maintain the current flowing in the switching regulator circuit above a threshold value.

14 Claims, 5 Drawing Sheets

REVERSE CURRENT PROTECTION/ CURRENT OVERSHOOT CONTROL FOR TWO QUADRANT BATTERY CHARGERS

BACKGROUND OF THE INVENTION

1. Field of the Invention

This invention relates to the field of portable battery equipment, and more particularly, to a method and apparatus for charging portable batteries using synchronous rectification.

2. Description of the Related Art

To improve customer satisfaction with portable battery operated equipment, in particular notebook computers, it is desired to re-charge batteries as quickly as possible. The amount of time required to charge a battery depends on the chemical process as well as the battery charger power processing efficiency.

Re-chargers for portable batteries utilize switching regulators to regulate DC power input from a DC voltage source such as a battery or an AC to DC adapter. Switching regulators are typically classified into different configurations or "topologies." On such topology is the single-ended inductor circuit, consisting of relatively simple circuits where a switch determines whether the voltage applied to an inductor is the input voltage, $V_{dc}$, or zero. In this manner, the output voltage is a function of the average voltage applied to the inductor. The switch may be implemented using various electronic components, for example, a power transistor, coupled either in series or parallel with the load. The regulator controls the turning ON and turning OFF of the switch in order to regulate the flow of power to the load. The switching regulator employs inductive energy storage elements to convert the switched current pulses into a steady load current. Power in a switching regulator is thus transmitted across the switch in discrete current pulses.

In order to generate a stream of current pulses, switching regulators typically include control circuitry to turn the switch on and off. The switch duty cycle, which controls the flow of power to the load, can be varied by a variety of methods. For example, the duty cycle can be varied by either (1) fixing the pulse stream frequency and varying the ON or OFF time of each pulse, or (2) fixing the ON or OFF time of each pulse and varying the pulse stream frequency. Which ever method is used to control the duty cycle, the switch in switching regulators is either OFF, where no power is dissipated by the switch, or ON in a low impedance state, where a small amount of power is dissipated by the switch. This generally results in fairly efficient operation with regard to the average amount of power dissipated.

One method that has been utilized to improve operational efficiency of voltage regulators employs synchronous rectification. In synchronous rectification, a pair of switches, which are connected in series between the input voltage and ground, are synchronized so that either the input voltage or ground is applied to the input of an inductor. The synchronous control of the switches provides improved efficiency compared to traditional circuits which employed a switch and a diode.

Certain switching regulators with synchronous rectification provide a positive output voltage, however, current can flow out of, or into the regulator's output. When input voltage is removed while current is flowing into the regulator's output, energy stored in the inductor will be discharged, creating excess voltage in the circuit. This over-voltage condition frequently results in destruction of circuit components.

There are several ways to prevent damage from reverse current. U.S. Pat. No. 5,731,694 issued to Wilcox et al. teaches a method and circuit for controlling reverse current in switching regulators with synchronous rectification. The Wilcox et al. patent optimizes protection during low load current efficiency but does not pertain to battery charging applications. Further, when power is removed and then reapplied to the Wilcox et al. device, the current overshoots a steady state value. In battery charging applications, this overshoot can cause undesirable oscillations in protection circuits, where a protection switch is tripped ON and OFF for several seconds. The oscillations result in pulse charging which greatly lowers the efficiency of the charging process. Additionally, the current overshoot decreases the useful life of battery charger components, which are fabricated with graphite having a lattice structure that breaks down when exposed to over-current conditions.

In view of the foregoing, it is desirable to provide a switching regulator with synchronous rectification for use in a battery recharger, wherein the switching regulator includes a control circuit which reduces or substantially eliminates current overshoot.

SUMMARY OF THE INVENTION

In one embodiment, the present invention pertains to a computer system wherein a rechargeable battery circuit supplies power to a central processing unit, and the power is dissipated from battery cells in the battery circuit as the power is supplied to the central processing unit. A battery recharger includes a switching voltage regulator circuit that supplies current and voltage to recharge the rechargeable battery circuit. The rechargeable battery circuit determines when a fault condition is present in the battery cells and opens a charging switch to prevent the current and voltage supplied by the switching voltage regulator from being applied to the battery cells. When the fault condition is cleared and the charging switch closes, a limiting circuit generates a control signal to prevent the current from overshooting a steady state value. The limiting circuit utilizes a limiting function, such as a ramp finction as input to a pulse width modulation comparator.

Another feature of the present invention is to provide a current amplifier in the limiting circuit that receives a current signal from the battery circuit and generates a current error signal that is input to the pulse width modulation comparator.

A further feature of the present invention is to provide a voltage amplifier in the limiting circuit that receives a voltage signal from the battery circuit and generates a voltage error signal, a current amplifier that receives a current signal from the battery circuit and generates a current error signal, and a power amplifier that receives a power signal from the battery circuit and generates a power error signal. The limiting circuit compares the voltage error signal, the current error signal, and the power error signal, and inputs the error signal having the greatest value to the pulse width modulation comparator.

In order to compare the error signals, a further feature of the limiting circuit includes an internal current source, a first transistor coupled to the current amplifier, a second transistor coupled to the voltage amplifier, and a third transistor coupled to the power amplifier. The first transistor, the second transistor, and the third transistor are coupled to the internal current source to determine the error signal having the greatest value.

Another feature of the present invention is to have a computer system which prevents reverse current flow in the switching voltage regulator by including a low current comparator that receives a signal indicative of the current flowing in the switching voltage regulator and generates an output signal, a transistor having a base coupled to receive the output signal from the low current comparator and to provide an input signal to a pulse width modulation comparator, wherein input signal maintains the current flowing in the switching regulator circuit above a threshold value.

In an alternative embodiment, an additional feature of the present invention is to provide an apparatus for controlling charge current in a battery recharging system. The apparatus includes a current amplifier receiving input indicative of charge current in a rechargeable battery circuit, and generating a current error signal, and a pulse width modulation comparator receiving a first input signal from a limiting function and a second input signal based on the current error signal.

A further feature of the present invention is to provide a voltage amplifier receiving input indicative of charge voltage in the rechargeable battery circuit, generating a voltage error signal, and outputting the voltage error signal to the pulse width modulation comparator.

A further feature of the present invention is to provide a power amplifier receiving a first power signal indicative of power in the switching voltage regulator and a second power signal indicative of power in the rechargeable battery circuit, generating a power error signal, and outputting the power error signal to the pulse width modulation comparator.

A further feature of the present invention is to provide a limiting circuit that compares the voltage error signal, the current error signal, and the power error signal to determine the error signal having the greatest value, and to generate an input signal to the pulse width modulation comparator based on the error signal having the greatest value.

A further feature of the present invention is to provide a limiting circuit that includes an internal current source, a first transistor coupled to the current amplifier, a second transistor coupled to the voltage amplifier; and a third transistor coupled to the power amplifier. The first transistor, the second transistor, and the third transistor are coupled to the internal current source to determine the error signal having the greatest value.

An additional feature of the present invention is to provide a limiting circuit that includes a low current comparator receiving a signal indicative of the current flowing in the switching voltage regulator, and generating an output signal, and a transistor coupled to receive the output signal from the low current comparator, and to generate a signal to maintain the current flowing in the switching regulator circuit above a threshold value.

In another embodiment, an additional feature of the present invention is to provide a method for controlling charge current in a battery recharging system wherein the battery recharging system includes a switching voltage regulator circuit coupled to a rechargeable battery circuit having a plurality of battery cells. The method includes: (a) determining when excess voltage is present in the battery cells; (b) opening a charge switch in the rechargeable battery circuit to prevent charge current from flowing to the battery cells when excess voltage is present the battery cells; (c) comparing current output by the switching voltage regulator circuit to charge current in the rechargeable battery circuit; and (d) limiting the current output by the switching voltage regulator to prevent overshoot in the charge current after the charge switch recloses.

An additional feature of the present invention is to provide a method for controlling charge current in a battery recharging system that further includes: (a) generating a voltage error signal based on the voltage output by the switching voltage regulator and charge voltage in the rechargeable battery circuit; (b) generating a current error signal based on the current flowing through a portion of the switching voltage regulator and charge current in the rechargeable battery circuit; (c) generating a power error signal based on the power input to the switching voltage regulator and charge power in the rechargeable battery circuit; (d) comparing the voltage error signal, the current error signal, and the power error signal to determine the error signal having the greatest value; and (e) limiting the current output by the switching voltage regulator based on the error signal having the greatest value.

The foregoing has outlined rather broadly the objects, features, and technical advantages of the present invention so that the detailed description of the invention that follows may be better understood.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
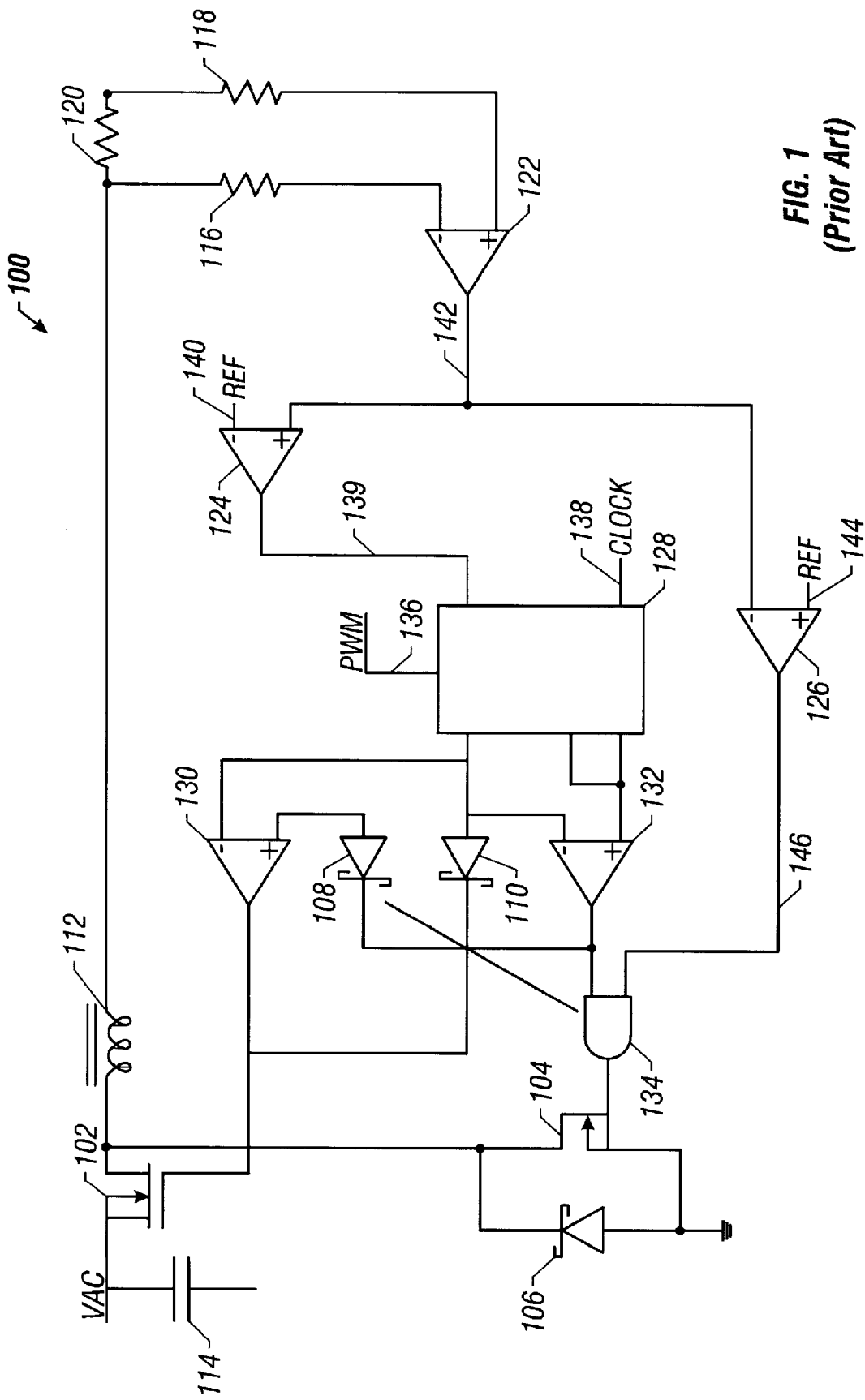
FIG. 1 is a schematic block diagram of a prior art switching regulator circuit employing a switch including a pair of synchronously-switched MOSFETs in a step-down configuration.

Referring to FIG. 1, a schematic block diagram of a switching regulator circuit 100 found in the prior art for providing a regulated DC output voltage $V_o$ to drive a load which, for example, may be a portable or laptop computer or other battery-operated system, is shown having a switch including a pair of synchronously-switched MOSFETs 102 (Q1) and 104 (Q2), diodes 106 (D1), 108 (D2), 110 (D3), inductor 112 (L1), capacitor 114 (C1), resistors 116 (R7), 118 (R9) and 120 (R10), current amplifier 122, over-current comparator 124, zero current detector 126, driver control circuit 128, high side driver circuit 130, low side driver circuit 132, and AND gate 134.

Figure 2A:
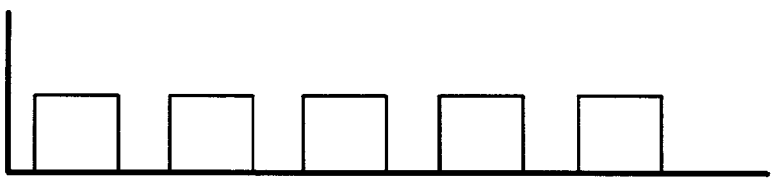
FIG. 2A is a time history diagram showing gate voltage at one MOSFET switch of the prior art switching regulator circuit of FIG. 1.
Figure 2B:
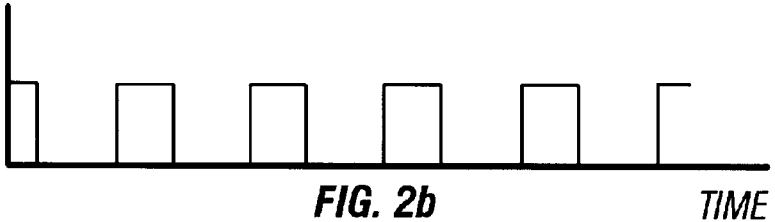
FIG. 2B is a time history diagram showing gate voltage at another MOSFET switch of the prior art switching regulator circuit of FIG. 1.
Figure 2C:
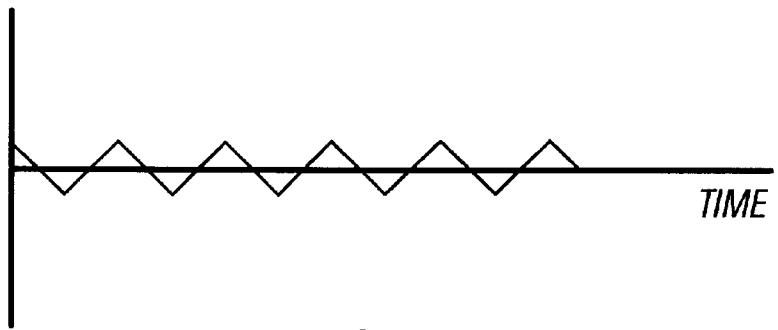
FIG. 2C is a time history diagram showing inductor current in the prior art switching regulator circuit of FIG. 1.

Switching regulator circuit 100 operates from an unregulated DC supply voltage $V_{dc}$ in couple to a terminal, e.g., a battery (not shown). Note that the DC source may be derived from the output of an AC adapter, or by other conventional means. The output voltage $V_o$ is the average voltage applied to inductor 112. Inductor 112 and capacitor 114 smooth the alternating supply of current to provide regulated voltage $V_o$. The alternating sequence of open and close actions by switching MOSFETs 102 and 104 regulates the voltage such that the longer switching MOSFETs 102 and 104 are closed, the higher the regulated voltage (because a higher average current flows through inductor 112). In order to supply the alternating current, MOSFETS 102 and 104 are respectively driven by high side driver 130 and low side driver 132, which in turn are both controlled by driver control circuit 128. Delay mechanisms, such as diodes 108 and 110, are incorporated in switching regulator circuit 100 to ensure that one MOSFET turns OFF before the other turns ON. FIGS. 2a through 2c show examples of time history graphs of pulse waveform output signals from high side driver 130 and low side driver 132 and time history of peak to peak current through inductor 112, respectively.

Driver control circuit 128 receives input signals including pulse width modulated (PWM) signal 136, clock signal 138, and over-current signal 139. Based on the input signals, driver control circuit 128 outputs an OFF pulse of constant duration (e.g., 2 to 10 microseconds) during which time MOSFET 104 is held OFF and MOSFET 102 is held ON by high side driver 130 and low side driver 132 respectively. Otherwise, driver control circuit 128 provides an ON pulse during which time MOSFET 104 is held ON and MOSFET 102 is held OFF. Thus, driver control circuit 128 alternately turns MOSFETS 102 and 104 ON and OFF to provide an alternating supply of current. The duty cycle of the driver control circuit 128 is controlled based on pulse width modulated (PWM) signal 136, clock signal 138, and over-current signal 139.

Inductor current $I_L$ is sensed by sampling resistor 120 and input to current amplifier 122. Resistors 116 and 120 scale voltage to generate input to current amplifier 122. Over-current comparator 124 receives current error signal 142 from current amplifier 122 and reference over-current signal 140. Over-current comparator 124 thus limits, or clamps, current transients by decreasing output voltage $V_o$. FIG. 2 shows a time history diagram of the inductor current $I_L$ of switching regulator circuit 100. At time $T_{off}$, input voltage $V_{dc}$ is cut off, and at time $T_{on}$, input voltage $V_{dc}$ is resumed. Such a cutoff of input voltage may occur, for example, when a protective circuit shuts off $V_{dc}$ due to a power over supply being delivered to the device driven by switching regulator circuit 100. If the protective circuit determines that the over supply condition has abated and that power should be supplied, it resumes supplying input voltage $V_{dc}$, denoted by time $T_{on}$. Inductor current $I_L$ ramps up to an overshoot value that is determined by the time constant of switching regulator circuit 100 and the value of the reference over-current signal 140. During the time period that $I_L$ overshoots its steady state value, current error signal 142 is greater than reference over-current signal 140. Accordingly, over-current signal 139 is HIGH, causing driver control circuit 128 to reduce the amount of time MOSFETs 102 and 104 are ON until current error signal 142 is less than reference over-current signal 140.

When MOSFET 102 is turned OFF by high side driver 130 and MOSFET 104 is turned ON by low side driver 132, inductor current $I_L$ begins to ramp down. During low average inductor currents, this current may ramp down towards zero and may eventually go negative, changing polarity of inductor 112. Zero current detector 126 monitors inductor current $I_L$ by way of current error signal 142. When current error signal 142 is greater than reference current signal 144, output signal 146 from zero current detector 126 goes LOW and turns OFF MOSFET 104 by way of AND gate 134. Turning OFF MOSFET 104 prevents current reversals in inductor current $I_L$ from drawing power from the load to ground through MOSFET 104. MOSFET 104 also prevents circuit 100 from becoming a voltage boost circuit instead of a buck circuit, wherein the increased voltages produced by the boost circuit would damage electronic components in circuit 100. After MOSFET 104 is turned OFF, it will again be allowed to turn ON as soon as current error signal 142 is less than reference current signal 144 to cause output signal 146 to go HIGH. Thus, switching regulator circuit 100 includes circuitry for intentionally holding MOSFET 104 OFF during periods when current reversals would otherwise allow power to be drawn from the load.

Figure 4:
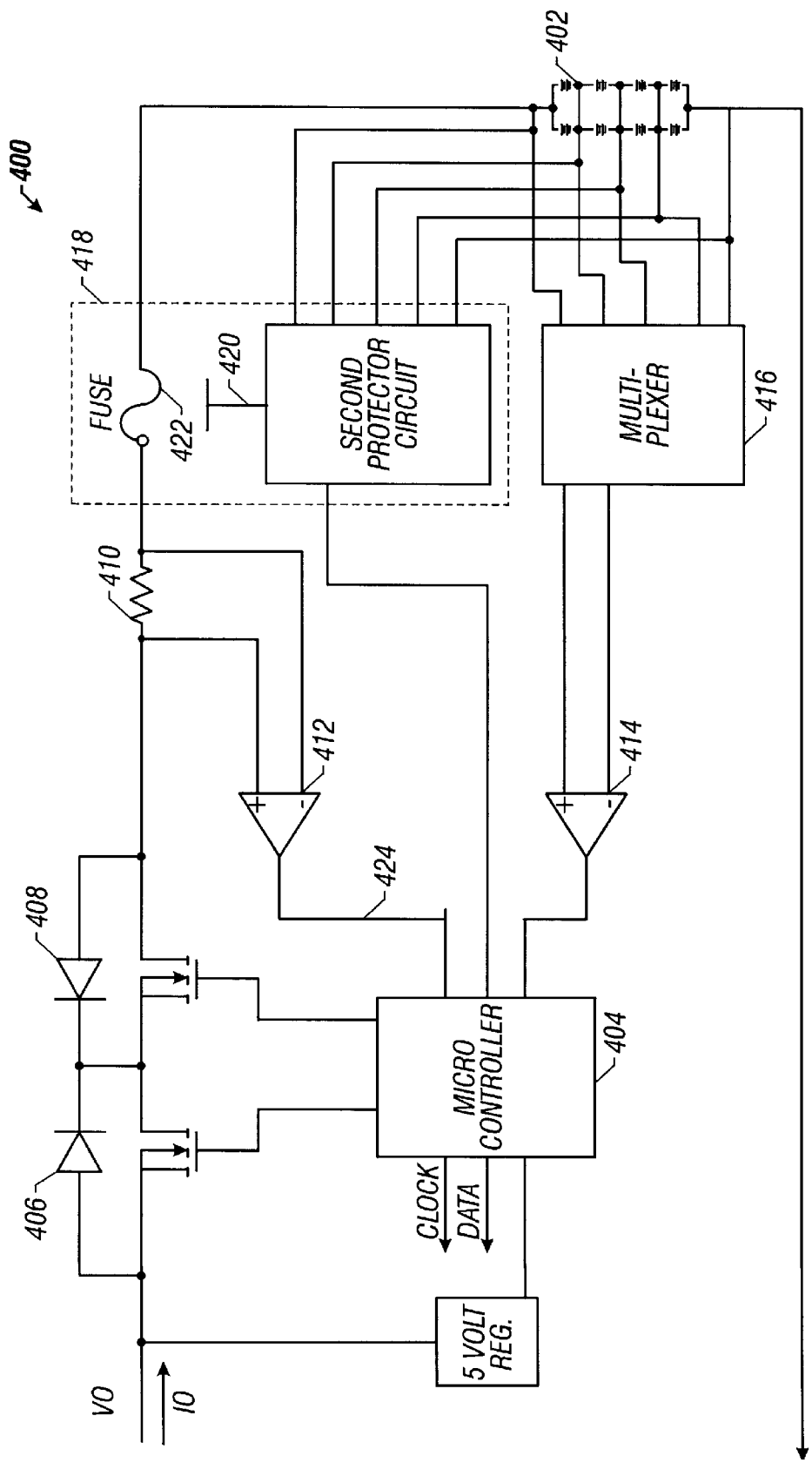
FIG. 4 is a schematic block diagram of a battery monitoring and control circuit internal to a battery pack.

Disadvantages of the prior art switching regulator circuit 100 arise when it is utilized with a battery circuit 400 such as shown in FIG. 4. Output voltage $V_o$ from switching regulator 100 is input to battery circuit 400 and supplies power for recharging battery cells 402. Such battery cells 402 may be constructed of various materials including lithium ion battery cells. In certain battery recharging systems, it is desirable to provide protective circuitry to prevent overcharging conditions. Battery circuit 400 includes microcontroller 404 to discharge switch 406 and charge switch 408, each shown in FIG. 4 as including a MOSFET and a diode connected in parallel. Microcontroller 404 controls the ON/OFF state of discharge switch 406 and charge switch 408 to prevent switching regulator circuit 100 output voltage $V_o$ from being applied to battery cells 402 when certain conditions are detected by microcontroller 404.

Inputs supplied to microcontroller 404 are generated utilizing current sense resistor 410, current amplifier 412, voltage amplifier 414, multiplexer 416, and backup protection circuit 418 including second protector circuit 420 and fuse 422. Current amplifier 412 receives signals indicative of the current flowing through current sense resistor 410 and outputs a scaled value of the current as current signal 424 to microcontroller 404. Microcontroller 404 utilizes the current signal to monitor the flow of current through battery circuit 400 and the proper operation of discharge switch 406 and charge switch 408. Multiplexer 416 and second protector circuit 420 receive signals indicative of the voltage across battery cells 402. Multiplexer 416 outputs a series of signals indicative of the voltage across individual battery cells 402 to voltage amplifier 414. Voltage amplifier 414 outputs scaled values of the voltage across each battery cell 402 to microcontroller 404. Second protector circuit 420 and microcontroller 404 utilize the voltage signals to monitor the voltage of each cell and detect overvoltage conditions.

Figure 3:
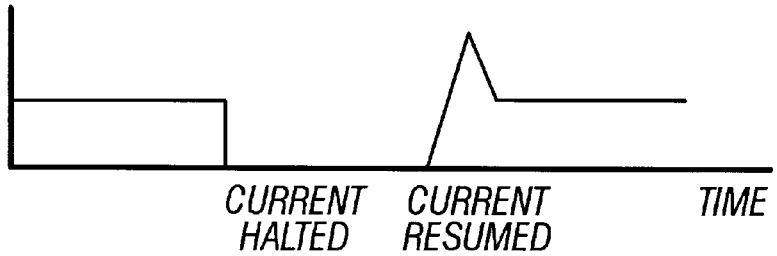
FIG. 3 is a time history diagram of output current in the prior art switching regulator circuit of FIG. 1.

The disadvantages of utilizing the prior art switching regulator circuit 100 with battery circuit 400 arise when the absolute value of any battery cell is greater than an upper limit and protection logic in the microcontroller 404 opens charge switch 408 to 285 prevent the flow of charge current $I_c$. When the open circuit voltage falls below a lower limit, microcontroller 404 closes charge switch 408 and charge current $I_c$ is allowed to flow to battery cells 402. If the charge current $I_c$ is allowed to overshoot when charge is resumed, as shown in FIG. 3, then the excess current causes the voltage in the battery cell to exceed the upper limit and an oscillatory condition results 290 between the overshoot current and protection logic in microcontroller 404. This oscillation causes repeated opening and closing of charge switch 408, and results in pulse charging of the battery. The pulse charging lowers the efficiency of the charging process and increases the amount of time required to charge battery cells 402. The value of the overshoot current may also violate battery charging 295 specifications.

Figure 5:
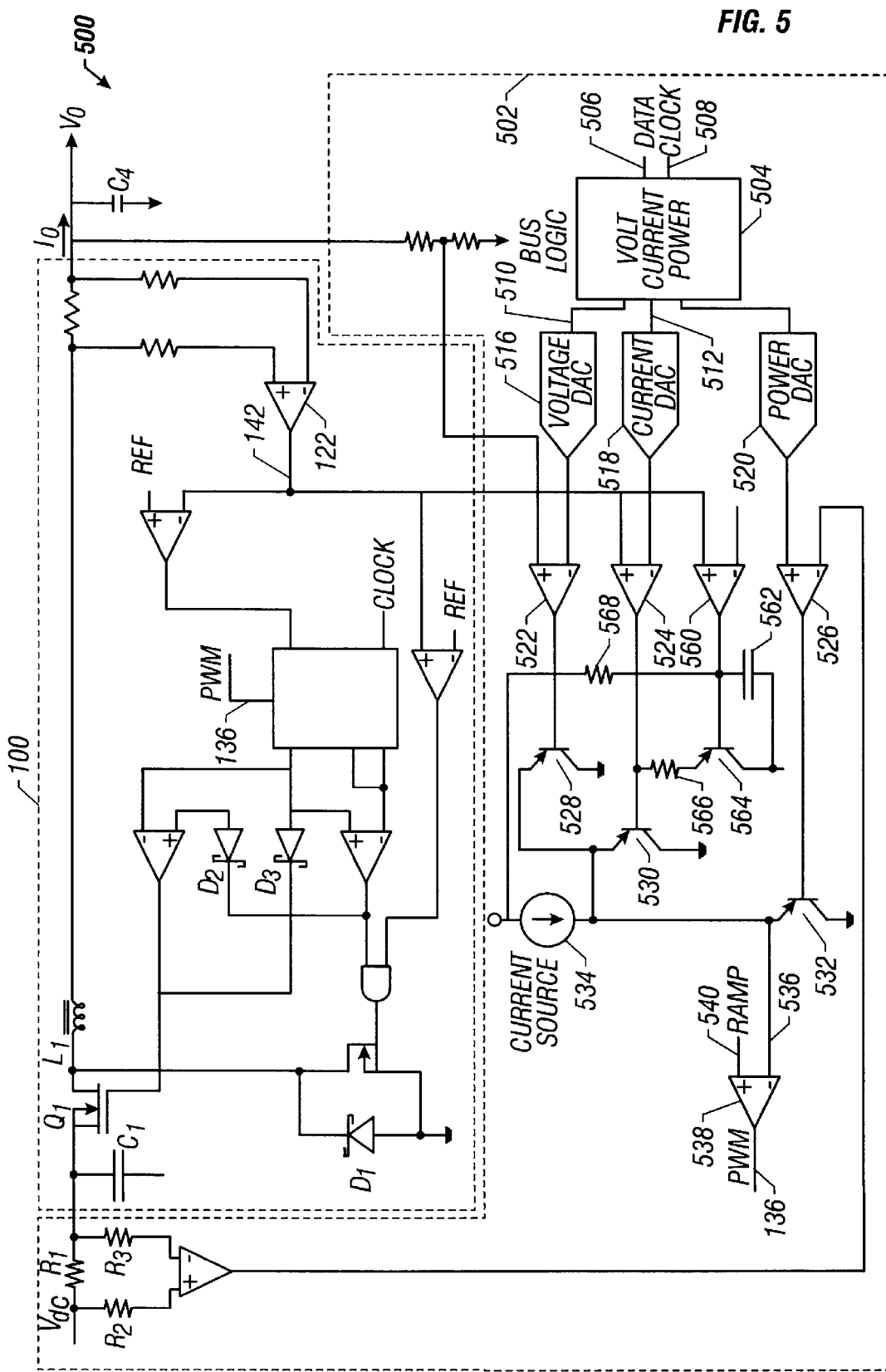
FIG. 5 is a schematic block diagram of a switching regulator circuit with synchronous rectification incorporating reverse current protection and current overshoot control circuits.

FIG. 5 shows a schematic diagram of an embodiment of a switching voltage regulator 500 incorporating the present invention for limiting circuit 502 for detecting and preventing reverse current flow and overshoot current when battery charging is resumed. For purposes of illustration, the present limiting circuit 502 is shown 300 coupled to prior art switching voltage regulator 100. Note, however, that the principles embodied in limiting circuit 502 may be applied to prevent overshoot in other voltage regulators, and the present invention is not intended to be limited in application to switching voltage regulator 100.

In order to prevent current overshoot, limiting circuit 502 uses power, voltage, 305 and current feedback to limit the charging voltage $V_c$. Limiting circuit 502 is coupled to microcontroller 404 in battery circuit 400 via system management bus 504 to receive battery data signal 506 and system time data signal 508. Logic is included in system management bus 504 to generate battery cell voltages signal 510, charge current signal 512, and charge power signal 514. Voltage, current, and power digital 310 to analog converters (DACs) 516, 518, 520 convert digital voltage, current, and power signals 510, 512, and 514 to analog signals that are input to voltage amplifier 522, current amplifier 524, and power amplifier 526, respectively, as feedback reference signals. Voltage amplifier 522 generates a voltage error signal based on output voltage $V_o$ from switching voltage regulator 100 and the voltage in battery circuit 400. Current amplifier 524 generates a current error signal based on current error signal 142 and the current in battery circuit 400. Power amplifier 526 generates a power error signal based on power input to switching voltage regulator 100 and the power in battery circuit 400. Amplifiers 522, 524, and 526 may be one of several commercially available amplifiers such as transconductance amplifiers. Other embodiments of the present invention may be utilized wherein one or two of the error signals are generated.

To regulate the current output by switching voltage regulator 100, the base of each transistor 528, 530, and 532 is coupled to receive voltage, current, and power error signals (in units of volts) output by amplifiers 522, 524, and 526, respectively. Transistors 528, 530, and 532 are coupled to constant current source 534 in a manner that wires the emitters of transistors 528, 530, and 532 in an OR configuration and pulls them up to current source 534. The dominant, or largest, signal between the output signals of the voltage amplifier 522, current amplifier 524, and power amplifier 526 is input to pulse width modulation (PWM) comparator 538 to provide an error voltage signal 536. Correspondingly fewer transistors are required in embodiments of the present invention that generate only one or two of the error signals.

Figure 6:
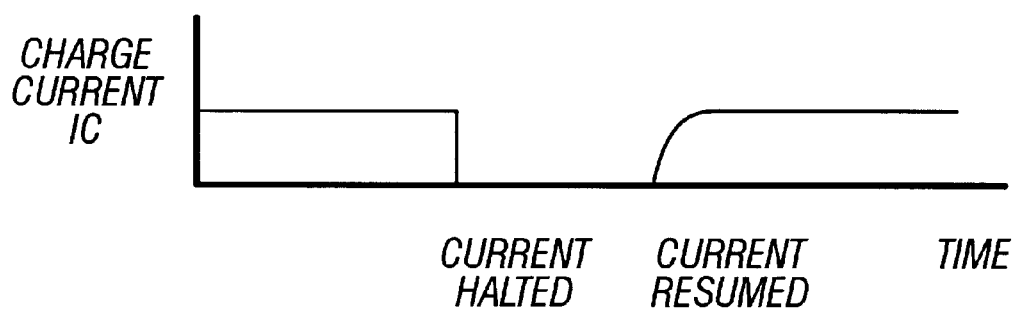
FIG. 6 is a time history diagram of inductor current from a battery charger incorporating reverse current protection and current overshoot control according to the present invention during a pulse charge event.

When the value of a limiting function, such as a ramp input 540 to PWM comparator 538 is greater than error voltage signal 536 from current source 534, PWM output signal 136 is HIGH. When the error voltage signal 536 from current source 534 is greater than the signal from ramp input 540, PWM output signal 136 is LOW. PWM output signal 136 is input to driver control circuit 128 in switching voltage regulator 100. The error voltage signal 536 and ramp input 540 thus determine the duty cycle of the driver control circuit 128 so that the output current $I_o$ and therefore, the charge current $I_c$, approaches the steady state current value with little or no overshoot as shown in FIG. 6. Note that the limiting function, shown as ramp input 540, may generate other types of limiting input instead of ramp input 540.

In addition to preventing current overshoot, limiting circuit 502 includes low current comparator 560, capacitor 562, transistor 564 and resistors 566, 568 to prevent reverse current flow in switching voltage regulator 100 as follows. When the output from current amplifier 524 is greater than the output from voltage amplifier 532 and power amplifier 526, and a steady charge current $I_c$ is present in battery circuit 400, low current comparator 560 is held HIGH at a predetermined current threshold, such as 100 milliamps. When charge current $I_c$ is interrupted, such as by an overcharge condition in battery circuit 400, or when the charge current $I_c$ falls below the predetermined current threshold, the output of low current comparator 560 transitions LOW, and the output current $I_o$ is clamped by transistor 564 and resistor 566 to a predetermined value, such as 200 milliamps. When microcontroller 404 opens charge switch 408, current control registers are programmed to provide a constant charge current $I_c$, for example, of 4 amps. In this situation, the output of voltage amplifier 522 will control the output of PWM comparator 538, providing a constant output voltage $V_o$. Thus, current is not allowed to fall below the threshold of transistor 564, thereby preventing reverse current in switching voltage regulator 100. When charge switch 408 is closed, output current $I_o$ is clamped by transistor 564 at the predetermined value. When charge current signal 512 crosses the predetermined current threshold, low current comparator 560 transitions HIGH. The voltage at the base of transistor 564 slowly rises due to the time constant of resistor 568 and capacitor 562. The rising base voltage of transistor 564 increases emitter current of transistor 564, and the output voltage of current amplifier 524 gradually increases.

The embodiment of the present invention shown in FIG. 5 utilizes hardware components such as amplifiers 522, 524, and 526, comparators 538 and 560, transistors 528, 530, 532, and 564, to implement the control circuitry for determining when to limit the current and voltage supplied by the switching voltage regulator 100 to battery circuit 400. The present invention may be implemented using alternative components. For example, limiting circuit 502 could be any device capable of receiving signals from battery circuit 400 and switching voltage regulator 100, generating a control signal, such as PWM signal 136, and inputting the signal to switching voltage regulator 100. One such device could be a microcontroller utilizing hardware, software, and/or firmware to read in the signals from DACS 516, 518, and 520, and provide a signal which is utilized to regulate the duty cycle of high side driver 130 and low side driver 132. Thus, it should be understood that the present invention provides a system for limiting charge current and/or charge voltage in a battery circuit, such as battery circuit 400, to prevent the charge current from overshooting a steady state value, and to further prevent reverse current from flowing through a voltage regulator in the system, such as switch power regulator 100.

While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the present invention, as defined by the following claims.

What is claimed:

1. A computer system comprising:
   a central processing unit operable to execute a set of instructions when power is applied to the central processing unit;
   a battery circuit coupled to supply power to the central processing unit, the power being dissipated from battery cells in the battery circuit as the power is supplied to the central processing unit;
   a battery recharger unit coupled to the battery circuit, the battery recharger unit including a switching voltage regulator circuit, the switching voltage regulator circuit being operable to supply current and voltage to the rechargeable battery circuit, the rechargeable battery circuit being operable to determine a fault condition in the battery cells and when to utilize the current and voltage supplied by the switching voltage regulator to recharge the battery cells; and
   a limiting circuit coupled to the switching voltage regulator circuit and to the rechargeable battery circuit, the limiting circuit including a pulse width modulation comparator operable to generate a pulse width modulated signal, the limiting circuit being operable to gradually increase the amount of current supplied by the switching voltage regulator when the current is utilized to recharge the battery cells by supplying a ramp input to the pulse width modulation comparator.

2. The computer system, as set forth in claim 1, wherein the limiting circuit further comprises:
   a current amplifier coupled to receive a current signal from the battery circuit, the current amplifier being operable to generate a current error signal;
   the limit circuit coupled to input the current error signal to the pulse width modulation comparator.

3. The computer system, as set forth in claim 1, wherein the limiting circuit further comprises:
   a voltage amplifier coupled to receive a voltage signal from the battery circuit, the voltage amplifier being operable to generate a voltage error signal;
   a current amplifier coupled to receive a current signal from the battery circuit, the current amplifier being operable to generate a current error signal;
   a power amplifier coupled to receive a power signal from the battery circuit, the voltage amplifier being operable to generate a power error signal;
   the limiting circuit coupled to compare the voltage error signal, the current error signal, and the power error signal, and to input the error signal having the greatest value to the pulse width modulation comparator.

4. The computer system, as set forth in claim 3, wherein the limiting circuit further comprises:
   an internal current source;
   a first transistor coupled to the current amplifier;
   a second transistor coupled to the voltage amplifier; and
   a third transistor coupled to the power amplifier, the first transistor, the second transistor, and the third transistor being coupled to the internal current source to determine the error signal having the greatest value.

5. The computer system, as set forth in claim 1, wherein the limiting circuit further comprises:
   a low current comparator coupled to receive a signal indicative of the current flowing in the switching voltage regulator, the low current comparator being operable to generate an output signal;
   a transistor having a base coupled to receive the output signal from the low current comparator, the transistor having an emitter coupled to provide an input signal to the pulse width modulation comparator, the transistor being operable to generate the input signal to maintain the current flowing in the switching regulator circuit above a threshold value.

6. An apparatus for controlling charge current in a battery recharging system, the battery recharging system including a switching voltage regulator circuit coupled to a rechargeable battery circuit, the apparatus comprising:
   a limiting circuit coupled to the switching voltage regulator circuit and the rechargeable battery circuit, the limiting circuit including:
      a current amplifier coupled to receive input indicative of charge current in the rechargeable battery circuit, the current amplifier being operable to generate a current error signal; and
      a pulse width modulation comparator coupled to receive a first input signal from a limiting function and a second input signal based on the current error signal, wherein the limiting function is a ramp function that provides the first input signal to gradually increase the amount of current supplied by the switching voltage regulator circuit until the current in the rechargeable battery circuit reaches a predetermined value.

7. The apparatus, as set forth in claim 6, wherein the rechargeable battery circuit includes a plurality of lithium ion battery cells.

8. The apparatus, as set forth in claim 6, further comprising a voltage amplifier coupled to receive input indicative of charge voltage in the rechargeable battery circuit, the voltage amplifier being operable to generate a voltage error signal, wherein the pulse width modulation comparator is coupled to receive the second input signal based on the voltage error signal.

9. The apparatus, as set forth in claim 6, further comprising a power amplifier coupled to receive a first power signal indicative of power in the switching voltage regulator and a second power signal indicative of power in the rechargeable battery circuit, the power amplifier being operable to generate a power error signal, wherein the pulse width modulation comparator is coupled to receive the second input signal based on the power error signal.

10. The apparatus, as set forth in claim 6, wherein the limiting circuit further comprises:
    a voltage amplifier operable to generate a voltage error signal;
    a power amplifier operable to generate a power error signal;
    the limiting circuit being further operable to compare the voltage error signal, the current error signal, and the power error signal to determine the error signal having the greatest value, and to generate the second input signal to the pulse width modulation comparator based on the error signal having the greatest value.

11. The apparatus, as set forth in claim 7, wherein the limiting circuit further comprises:
    an internal current source;
    a first transistor coupled to the current amplifier;
    a second transistor coupled to the voltage amplifier; and
    a third transistor coupled to the power amplifier, the first transistor, the second transistor, and the third transistor being coupled to the internal current source to determine the error signal having the greatest value.

12. The apparatus, as set forth in claim 6, wherein the limiting circuit further comprises:

a low current comparator coupled to receive a signal indicative of the current flowing in the switching voltage regulator, the low current comparator being operable to generate an output signal;

a transistor having a base coupled to receive the output signal from the low current comparator, the transistor having an emitter coupled to provide the second input signal to the pulse width modulation comparator, the transistor being operable to generate the second input signal to maintain the current flowing in the switching regulator circuit above a threshold value.

13. A method for controlling charge current in a battery recharging system wherein the battery recharging system includes a switching voltage regulator circuit coupled to a rechargeable battery circuit having a plurality of battery cells, the method comprising:

determining when excess voltage is present in the battery cells;

opening a charge switch in the rechargeable battery circuit to prevent charge current from flowing to the battery cells when excess voltage is present the battery cells;

comparing current output by the switching voltage regulator circuit to charge current in the rechargeable battery circuit; and using a limiting function to limit the current output by the switching voltage regulator to prevent overshoot in the charge current after the charge switch re-closes.

14. The method, as set forth in claim 13, further comprising:

generating a voltage error signal based on the voltage output by the switching voltage regulator and charge voltage in the rechargeable battery circuit;

generating a current error signal based on the current flowing through a portion of the switching voltage regulator and charge current in the rechargeable battery circuit;

generating a power error signal based on the power input to the switching voltage regulator and charge power in the rechargeable battery circuit;

comparing the voltage error signal, the current error signal, and the power error signal to determine the error signal having the greatest value; and limiting the current output by the switching voltage regulator based on the error signal having the greatest value.

* * * * *